*T. Barfield,*
*Steam Condenser.*
Nº 89,725.  Patented May 4. 1869.
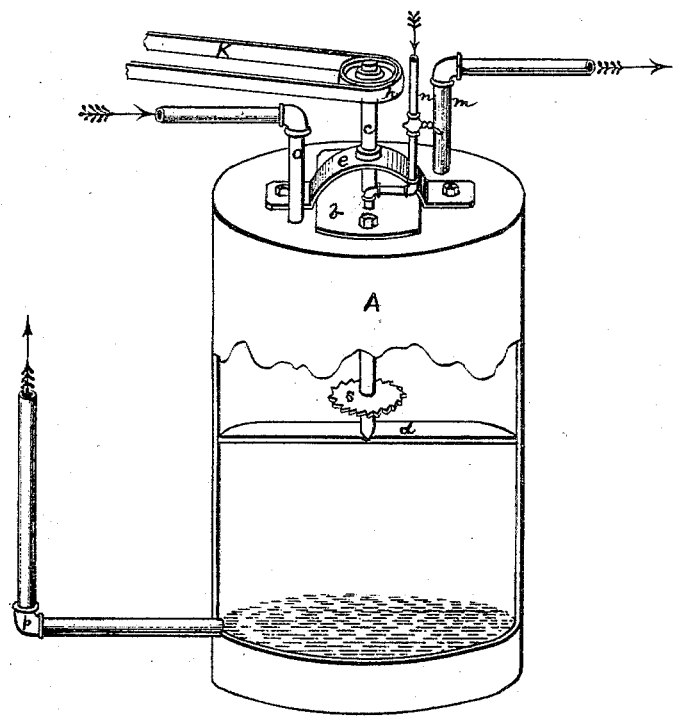
Attest.
C. N. Pickles
C. H. Alexander
Inventor.
Thos Barfield
pr Saml S Boyd
atty

United States Patent Office.

THOMAS BARFIELD, OF ATHENS, ILLINOIS.

Letters Patent No. 89,725, dated May 4, 1869.

---

IMPROVED DEVICE FOR PREVENTING INCRUSTATION IN BOILERS.

---

The Schedule referred to in these Letters Patent and making part of the same.

---

*To all whom it may concern:*

Be it known that I, THOMAS BARFIELD, of Athens, in the county of Menard, and State of Illinois, have invented a new and useful Improved Water-Purifier for Steam-Boilers, of which the following is a full, clear, and exact description, reference being had to the annexed drawing, making a part of this specification, and representing a vertical elevation of the purifying-tank, with a portion of same in section.

The object of my invention is to purify the feed-water for steam-boilers from the lime and other crystallizable salts contained in it, and thereby prevent the deposit and incrustation in the boiler.

It consists of an iron tank, A, of suitable size, having a man-hole in the top, covered by a plate, $b$, through the centre of which passes a spindle, $c$, resting on the step $d$, in the inside of the tank, and also passing through the yoke $e$, and terminating in a driving-wheel, $h$, connected by a belt, $k$, with the engine.

Near the foot of this spindle is placed a toothed wheel $s$.

The pipe $n$, connecting with the reservoir, supplies the tank with water, which, by a force-pump connected with $p$, is carried to the boiler.

The dead steam from the engine enters the tank through the pipe $o$, and passes out through $m$.

The water entering $n$, falls upon the toothed wheel $s$, which rapidly revolving cuts it, and throws it in a spray on the sides of the tank heated by the steam, down which it trickles, depositing in its course the lime and crystallizable salts contained in it, in the form of an incrustation on the sides of the tank, so that when it reaches the bottom it is clear and pure, ready to be forced directly to the boiler through $p$.

In order to increase the surface, I frequently hang common ropes from the top of the tank, which can be removed and others substituted, as desired.

Care must be taken to keep the water in the tank low enough not to interfere with the process of incrustation.

To give an idea of the dimensions of the various parts, I will give those of the one now used by me with a sixty-four-horse engine:

The tank is four feet in diameter at the top and six feet in length; the toothed wheel about sixteen inches in diameter, placed about six inches from the top of the tank, and made to revolve about one hundred and fifty times a minute. The pipe $n$ is three-quarters of an inch, and $p$ one and one-quarter of an inch in diameter, so that only about ten inches of water stand in the tank.

I am well aware that attempts have been made heretofore to purify feed-water for steam-boilers, by passing it over perforated plates in a tank, through which steam is made to pass, so I do not claim any novelty in the principle; but What I do claim as my invention, and desire to secure by Letters Patent, is—

The toothed wheel $s$, with its spindle and driving-wheel, when arranged, with reference to the pipes $m$ $n$ $o$ $p$ and the tank A, substantially as herein specified.

THOMAS BARFIELD.

Witnesses:
PETER GRAHAM,
J. M. JORDAN.